(12) United States Patent
Ligeret

(10) Patent No.: US 8,774,769 B2
(45) Date of Patent: Jul. 8, 2014

(54) UPDATING TIMESTAMPS OF SHORT MESSAGES

(75) Inventor: Xavier Ligeret, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 391 days.

(21) Appl. No.: 13/080,227

(22) Filed: Apr. 5, 2011

(65) Prior Publication Data

US 2012/0058776 A1 Mar. 8, 2012

Related U.S. Application Data

(60) Provisional application No. 61/380,100, filed on Sep. 3, 2010.

(51) Int. Cl.
| | |
|---|---|
| *H04L 12/58* | (2006.01) |
| *H04M 1/725* | (2006.01) |
| *H04M 1/663* | (2006.01) |
| *H04W 24/00* | (2009.01) |
| *H04W 4/00* | (2009.01) |

(52) U.S. Cl.
USPC .................. 455/412.1; 455/412.2; 455/456.1; 455/466; 370/252

(58) Field of Classification Search
CPC .... H04W 4/12; H04W 88/02; H04L 12/5895; H04L 29/08108; H04M 1/72547
USPC ............... 455/412, 456.1, 412.1, 412.2, 466; 370/252; 707/3
See application file for complete search history.

(56) References Cited

U.S. PATENT DOCUMENTS

| | | | | |
|---|---|---|---|---|
| 5,797,094 | A * | 8/1998 | Houde et al. | 455/412.2 |
| 5,946,629 | A * | 8/1999 | Sawyer et al. | 455/466 |
| 7,460,486 | B2 * | 12/2008 | Hopkins | 370/252 |
| 2004/0203620 | A1 * | 10/2004 | Thome et al. | 455/412.1 |
| 2004/0260680 | A1 * | 12/2004 | Best et al. | 707/3 |
| 2008/0057919 | A1 | 3/2008 | Choi-Grogan et al. | |
| 2012/0058776 | A1 * | 3/2012 | Ligeret | 455/456.1 |

* cited by examiner

*Primary Examiner* — William D Cumming
(74) *Attorney, Agent, or Firm* — Lee & Hayes, PLLC

(57) ABSTRACT

A time stamp of a message from a sending mobile device may be modified to correlate with the time zone occupied by a recipient mobile device. A message from a sending mobile device may be received at a message center. The message center may then route the message to a switch that manages the recipient mobile device, in which the switch is in a time zone that is different from the time zone occupied by the recipient mobile device. Accordingly, the switch may update a time stamp of the message to correlate with the time zone occupied by the recipient mobile. Following the update, the switch may transfer the message with the updated time stamp to the recipient mobile device.

21 Claims, 7 Drawing Sheets

UPDATING TIMESTAMPS OF SHORT MESSAGES

CROSS REFERENCE TO RELATED PATENT APPLICATIONS

This patent application claims priority from U.S. Provisional Application No. 61/380,100, filed Sep. 3, 2010, which application is hereby incorporated in its entirety by reference.

BACKGROUND

Mobile communication subscribers who roam in different time zones may occasionally receive short message service (SMS) text messages on their mobile devices that have incorrect time stamps. For example, a subscriber who normally resides Seattle but who has traveled to New York for business may receive a text message from a sender. However, the time stamp for the text message may report a time that corresponds with the time zone for Seattle rather than the time zone for New York. Such time discrepancies may be caused by a failure of the mobile telecommunication network to properly update the time stamp for the time zone at which the subscriber is currently located.

In some instances, the failure the mobile telecommunication network to properly update the time stamp may be caused by the use of mobile service center (MSC) pooling, in which the MSC that is suppose to update the time stamp of the text message for the recipient subscriber is unaware of the time zone that the recipient subscriber is currently located in due to roaming activities of the recipient subscriber. An incoming text message with a time stamp that does not correspond with the time zone that the recipient subscriber is currently occupying may cause the recipient subscriber to believe such a text message was sent at an earlier time or at a later time than the actual text message transmission time. Such time stamp discrepancy may cause the recipient subscriber to question the service reliability of the mobile communication service provider that delivered the text message.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
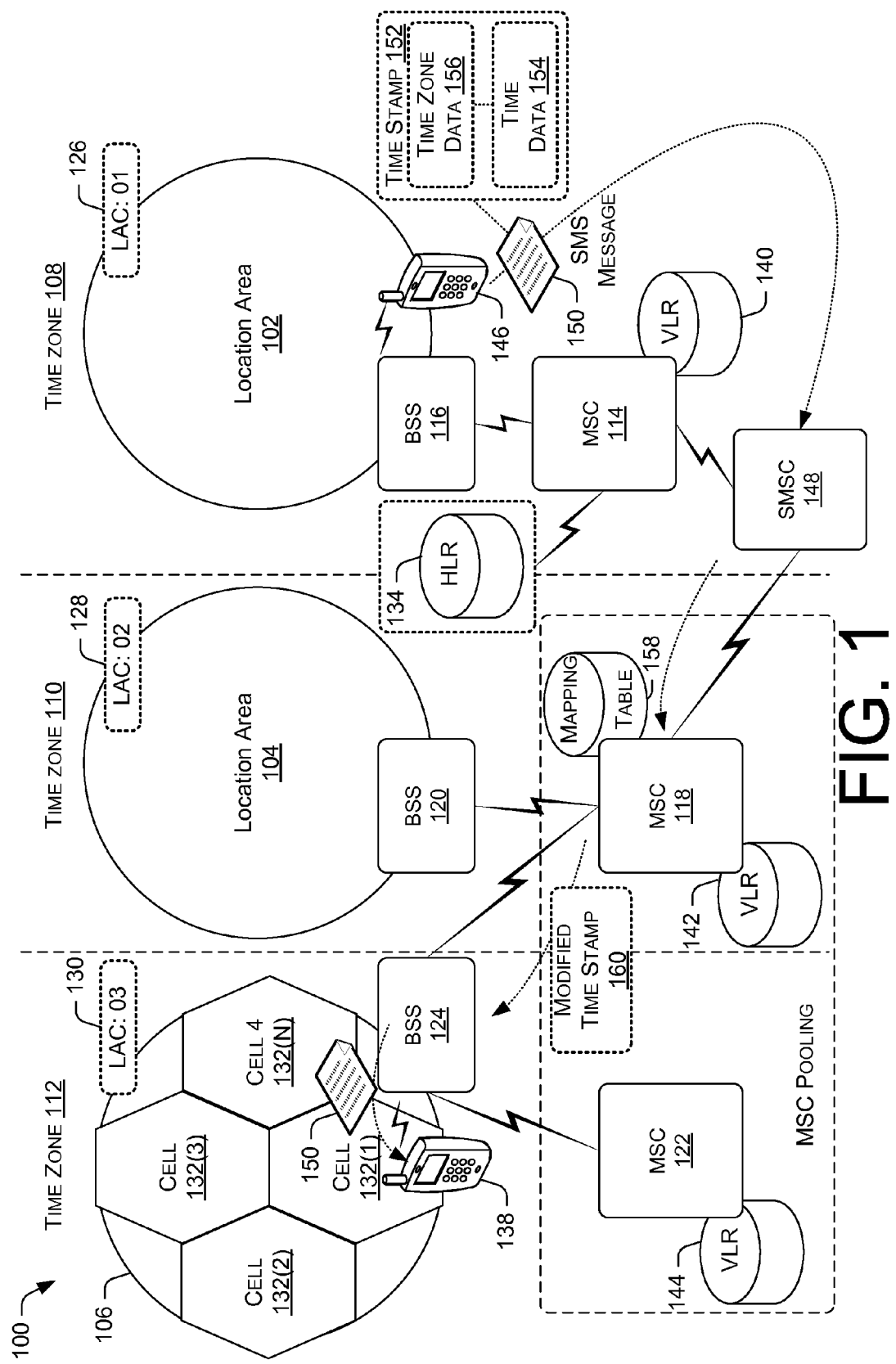
FIG. 1 is a block diagram showing an illustrative environment for providing message time stamps and time information that correspond to the time zone of a recipient mobile device, in accordance with various embodiments.

Described herein are techniques for updating time stamps for short message service (SMS) messages that are sent between mobile devices. With the implementation of such techniques, a time stamp for a text message that is sent from a sending mobile device to a recipient mobile device may be updated to report a time that corresponds with the time zone at which the recipient mobile device is located. The time stamp of the text message may report a time that the text message sent by the sending mobile device is received at a short message service center (SMSC) that eventually transmits the text message to the recipient mobile device. In some embodiments, a mobile service center (MSC) or a serving GPRS support node (SGSN) of a telecommunication network that is transmitting the text message from the sending mobile device to the recipient mobile device may detect the time zone that the recipient mobile device is currently located. The current time zone of the recipient mobile device may be determined from a code mapping table that correlates a location area code (LAC) or a routing area code (RAC) of the recipient mobile device to a specific time zone. Accordingly, the time stamp of the text message may be modified to report a time that is adjusted to the time zone occupied by the recipient mobile device. Thus, if the sending mobile device and the recipient mobile device of the text message are actually located in the same time zone, then no net adjustment of the time stamp may occur. On the other hand, time stamp adjustment may occur when the sending mobile device and the recipient mobile device are located in different time zones. In some instances, the adjustment may also take into account the adoption of day light savings time by the governing jurisdictions in the different time zones.

In other instances, the use of the code mapping table that correlates a location area code (LAC) or a routing area code (RAC) of a mobile telecommunication service subscriber to a specific time zone may be used to update the time on a mobile device, such as via the network identity and time zone (NITZ) data that is transmitted to a subscriber's mobile device. The NITZ may be transmitted to the subscriber's mobile device during initial power up of the mobile device and registration of the mobile device with the telecommunication network. Accordingly, the accurate update of the NITZ data may enable the mobile device to automatically adjust to different local time zone as the subscriber roams into various designated regions.

In some implementations, a time stamp of a message from a sending mobile device may be modified to correlate with the time zone occupied by a recipient mobile device. A message from a sending mobile device may be received at a message center. The message center may then route the message to a switch that manages the recipient mobile device, in which the switch is in a time zone that is different from the time zone occupied by the recipient mobile device. Accordingly, the switch may update a time stamp of the message to correlate with the time zone occupied by the recipient mobile. Following the update, the switch may transfer the message with the updated time stamp to the recipient mobile device.

In other implementations, a mobile device may be detected as establishing a communication link with a switch of a mobile telecommunication network. When this occurs, a location code for the mobile device that indicates a current location area of the mobile device may be obtained. The location code may be correlated to a time zone using a code mapping table. The code mapping table may associate each location code of a plurality of location codes with a corresponding time zone. As such, time data that correlates with the time zone of the mobile device may be sent to the mobile device.

Thus, the techniques described herein may alleviate time zone discrepancy problems for text messages caused by the implementation of MSC pooling by mobile telecommunication service providers. Further, the techniques described herein may provide greater convenience for subscribers by consistently and accurately adjust the time shown by their mobile devices to different local time zones as they roam in various designated regions. Thus, subscriber confidence in the reliability of the mobile telecommunication networks that impellent these techniques may be increased, which may result in increased subscriber satisfaction and greater subscriber retention.

Overview

FIG. 1 is a block diagram showing an illustrative environment 100 for providing message time stamps and time information that correspond to the time zone of a recipient mobile device, in accordance with various embodiments.

The environment 100 may be a mobile telecommunication network that includes a plurality of location areas, such as the location areas 102-106. Each of the location areas may be in a time zone. For example, the location area 102 may be entirely within a time zone 108, the location area 104 may be entirely within a time zone 110, and the location area 106 may be entirely within a time zone 112. However, in other embodiment, multiple location areas of the mobile telecommunication network may occupy the same time zone. A time zone, as used herein, refers to a global region that uses a uniform standard time, which may be also described as the local time for the region. By convention, a time in each time zone may be computed from a corresponding offset from a standard time, for example, Greenwich Mean Time (GMT). For example, the time zone 108 that encompasses the location area 102 may be the Eastern Standard Time (EST) time zone of North America, while the time zone 112 that encompasses the location area 106 may be the Pacific Standard Time (PST) time zone of North America.

In some embodiments, each location area of the mobile telecommunication network may be serviced by a corresponding mobile service center (MSC) and a corresponding base station subsystem (BSS). For example, the location area 102 may be serviced by a MSC 114 and a BSS, such as a BSS 116. Likewise, the location area 104 may be serviced by a MSC 118 and a BSS, such as a BSS 120, and the location area 106 may be serviced by a MSC 122 and a BSS, such as a BSS 124. Each of the location areas in the mobile telecommunication network may be assigned a corresponding location area code (LAC). For example, the location area 102 may have a LAC 126 (e.g., "01") that identified the location area 102. Likewise, the location area 104 may have a LAC 128 (e.g., "02"), and the location area 106 may have a LAC 130 (e.g., "03").

A MSC is generally a network element in a mobile telecommunication network that routes telecommunication transmissions, such as voice or data transmissions, between mobile devices in a corresponding location area and other location areas. The MSC may include a plurality of network switching components that perform call switch and mobility management functions for mobile devices that roams on the BSSs managed by the MSC. A BSS is a component of a mobile telecommunication network that handles traffic and signals between mobile devices and a corresponding MSC. For example, the BSS may perform the transcoding of speech channels, allocation of radio channels to mobile device, paging, transmission and reception of voice and data, as well as other functions.

In turn, a BSS may include several base transceiver stations (BTS), each BTS may include a transceiver, antenna, and additional network switch and control equipment that provide a network cell that facilitate wireless communication between mobile devices and the corresponding MSC. For example, as shown in FIG. 1, the BSS 124 may provide a network cell 132(1) for the location area 106. Other network cells in the location area 106, such as network cells 132(2)-124(N), may be provided by additional BTSs that are managed by the MSC 122.

At least one of the MSCs in the mobile telecommunication network may be a gateway MSC that is responsible for routing voice and data that is received at a BSS on the network to the appropriate MSC for transmission to a recipient mobile device. For example, the MSC 114 may be a gateway MSC. In performing its gateway functions, the MSC 114 may use a location register, such as the home location register (HLR) 134. The HLR 134 may be a database that contains details on each mobile device subscriber that is authorized to use the mobile telecommunication network. Further, as an authorized mobile device (e.g., mobile device 138) roams on the mobile telecommunication network, the HLR 134 may continuously store data that tracks the current the specific MSC that is currently handling the authorized mobile device.

Each of the MSCs may also include a local subscriber register, such as a visited location register (VLR) that tracks authorized mobile devices that are in the location area managed by the MSC. For example, the MSC 114 may include a VLR 140, the MSC 118 may include a VLR 142, and the MSC 118 may include a VLR 144. Thus, for example, when the mobile device 138 roams into or powers up in the location area 106 managed by the VLR 144 for a first time, the MSC 122 using the VLR 144 may cause the data in the HLR 134 to be updated. The updated HLR 134 may indicate that the mobile device 138 has arrived at the MSC 122. Subsequently, the MSC 122 may use the VLR 144 to track the mobile device 138 as the mobile device 138 roams in the different network cells 132(1)-132(N) of the location area 106. In various embodiments, each of the network cells 132(1)-130(N) in a location area 106 may be identified with a unique cell identifier, which may be referred to as a Cell Identity (CI) in some embodiments of the mobile telecommunication network shown in the environment 100. The VLR 144 may track the mobile device 138 with a register entry in the VLR 144 that is continuously updated. For example, the register entry may associate the mobile device 138 with the unique cell identifier of the current network cell (e.g., network cell 132(1)) that is handling the mobile device 138. However, as the mobile device 138 roams into the network cell 132(2), the register entry may be updated to associate the mobile device 138 with the unique identifier of the network cell 132(2).

Accordingly, the VLR 144 may track the mobile device 138 by both the LAC of a location area and the cell identifier of the network cell in the location area that the mobile device 138 is occupying. For example, when the mobile device 138 is in network cell 132(1) of the location area 106, the VLR 144 may record the location of the mobile device 138 with a register entry that has the LAC 130 (i.e., "03") for the location areas 106, and the cell identifier "01" for the network cell 132(1).

Further, a VLR for a location area may cease to track a mobile device after mobile device becomes inactive for a predetermined period of time (e.g., when the mobile device is switched off) or the mobile device has moved to another location area that is managed by a different VLR. For example, the VLR 144 may cease to track the mobile device 138 when the mobile device 138 leaves the location area 106.

As such, an example voice communication, e.g., a phone call, between the mobile device 138 of a subscriber that is within the location area 102 and a mobile device 146 that is within the location area 106 may be respectively handled by the BSS 116 and the BSS 124 at each subscriber end respectively, and routed through the mobile telecommunication network between the MSC 114 and the MSC 122.

Further, short message service (SMS) message that are transmitted between authorized mobile devices on the mobile telecommunication network may be handled by a SMSC, such as the SMSC 148. For example, when a subscriber composes a SMS message 150 for delivery to the subscriber of the mobile device 138, the SMS message 150 is initially routed through the BSS 116 and the MSC 114 to the SMSC 148. The SMSC 148 may then route the SMS message 150 to the appropriate MSC and BSS for delivery to the mobile device 138.

In various instances, the specified MSC that delivers the SMS message 150 to the mobile device 138 may be impacted by implementation of MSC pooling. MSC pooling may enable the sharing of network resources and network subsystems (e.g., BSSs) by different MSCs. Such consolidation of network resources and subsystems may reduce the expenses associated with creating and maintain a mobile telecommunication network.

However, MSC pooling may change the way mobile devices are managed as the mobile devices roam the mobile telecommunication network. For example, in a scenario in which the MSC 118 and the MSC 122 are pooled, the MSC 118 may continue to manage the mobile device 138 using the VLR 142 even when the mobile device 138 roams from the location area 104 to the location area 106. In contrast, without MSC pooling, the MSC 118 may have transferred the management of the mobile device 138 to the MSC 122 when such location area changed occurred.

Thus, without MSC pooling of the MSC 118 and the MSC 122, the SMSC 148 may have routed the SMS message 150 to the mobile device 138 through the MSC 122 and the BSS 124. However, in the scenario in which the MSC 118 and the MSC 122 are pooled, the SMSC 148 may instead route the SMS message 150 to the MSC 118, then to the BSS 124 for delivery to the mobile device 138.

The routing of the SMS message 150 in the MSC pooling scenario may cause the time stamp 152 of the SMS message 150 to display an incorrect time when the SMS message is received by the mobile device 138. The time stamp 152 of the SMS message 150 may have been initially generated by the SMSC 148 when the SMS message 150 is received by the SMSC 148. The time stamp 152 may include time data 154 that indicates the time at which the SMS message 150 is received at the SMSC 148. In at least one embodiment, the time data 154 may include day, month, year, hour, minute, and second data. The time stamp 152 may further include time zone data 156 that indicate the time zone, i.e., time zone 108, correlating to the time value in the time data 154.

Further, the SMSC 148 may ascertain the identity of the MSC (i.e., MSC 118) that is to deliver the SMS message 150 to the mobile device 138. For example, the SMSC 148 may have obtained the MSC identity information from the HLR 134. Accordingly, the SMSC 148 may use a mapping table to look up the time zone that is associated with such an MSC (i.e., time zone 110). Thus, the SMSC 148 may adjust the time stamp 152 of the SMS message 150 to indicate a time in accordance with time zone 112 prior to message delivery. In other words, since the SMSC has ascertained that the MSC 118 is in time zone 110, the MSC 122 may figure out the time difference between the time zone 110 and the time zone 108 (as reported by the time zone data 156), and then adjust the time data 154 accordingly. For example, if the time zone 108 is ahead of the time zone 110 by two hours, then the SMSC 148 may subtract two hours from the time value in the time data 154. Following this time adjustment, the SMSC 148 may forward the SMS message 150 with the adjusted time stamp 152 to the MSC 118 for delivery to the mobile device 138 via the BSS 124.

However, the adjustment of the time stamp 152 by the SMSC 148 for the time zone 110 may have actually resulted in a time stamp 152 with the time data 154 and the time zone data 156 that do not correlated with the time zone 112 occupied by the mobile device 138, which is to receive the SMS message 150. Thus, when the subscriber of the mobile device 138 receives the SMS message 150 in such a scenario, the subscriber may be misled into thinking that the SMS message was sent from the mobile device 146 at an earlier or later time than the actual transmission time. Further, the problem with incorrect time stamp adjustments by the SMSC 148 may also occur in other scenarios even in the absence of MSC pooling, such as scenarios in which a single MSC or a single SGSN may be set up from the start to managing different location areas that are in different time zones.

In various embodiments, the problem with the incorrect adjustment of the time stamp 152 by the SMSC 148 in the MSC pooling scenario and other scenarios described above may be solved with the further adjustment of the time stamp 152 by a MSC that is to actually deliver a SMS message to a recipient mobile device. As further described below, the additional adjustment of the time stamp 152 may be implemented with the use of a code mapping table. For example, when the MSC 118 receives the SMS message 150 for delivery to the mobile device 138, the MSC 118 may use a code mapping table 158 to correctly modify the time data 154 in the time stamp 152 for the time zone 112 instead of the time zone the MSC 118 is in, namely time zone 110.

The code mapping table 158 may include data entries that correlate the LACs of location areas to time zone designations. Thus, by initially consulting the VLR 142, the MSC 118 may discover that the mobile device 138 is currently in the location area 106. Subsequently, the MSC 118 may consult the code mapping table 158 to determine that the LAC 130 of the location area 106 is associated with the time zone 112. Accordingly, the MSC 118 may modify the time stamp 152 into a modified time stamp 160 with a time that is adjusted to conform to the time zone 112. The modification of the time stamp 152 by the MSC 118 using information from the code mapping table 158 is further illustrated in additional detail in FIG. 2.

Figure 2:
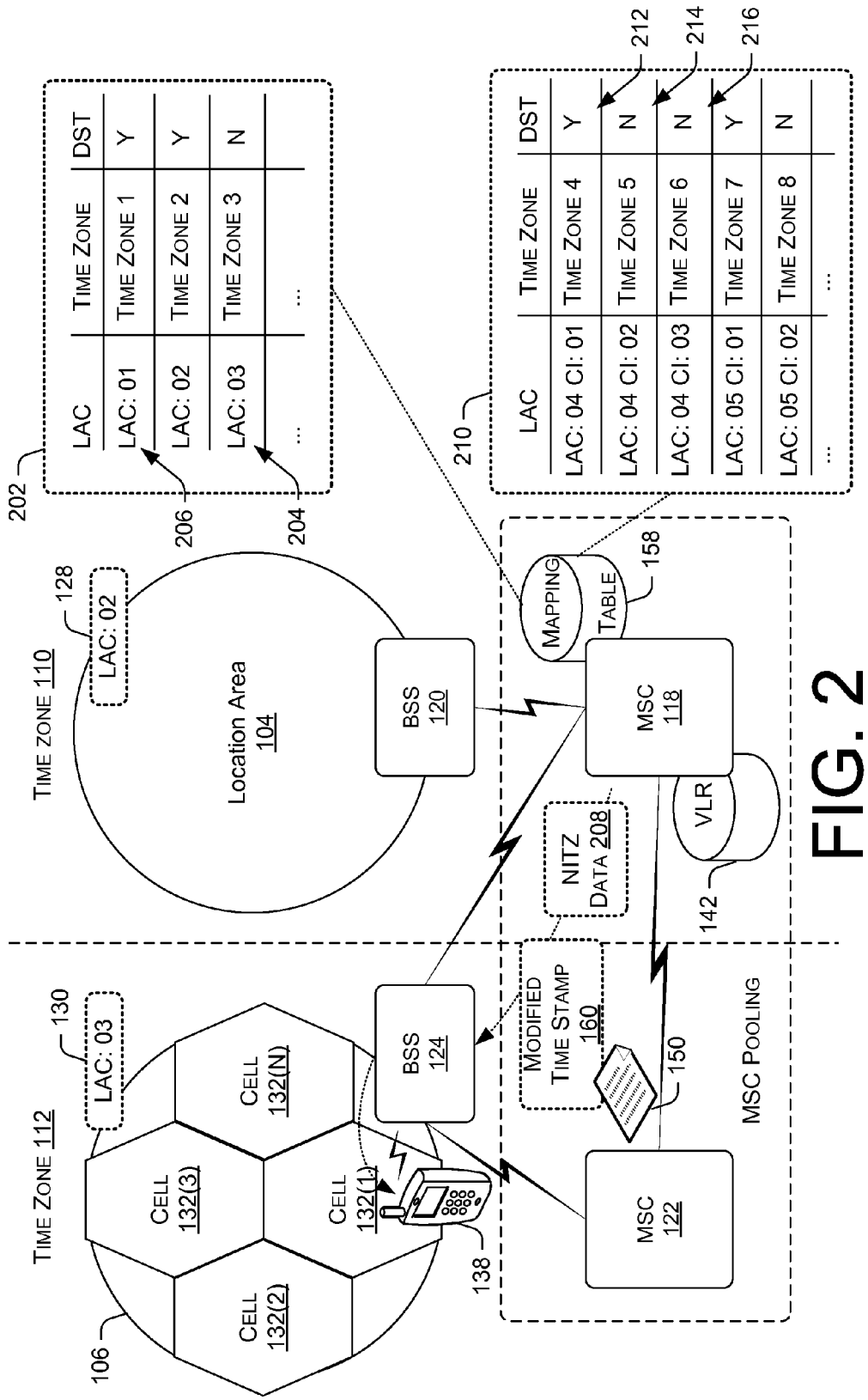
FIG. 2 is a block diagram that illustrates the use of a code mapping table that correlates location codes to time zones, in accordance with various embodiments.

FIG. 2 is a block diagram that illustrates the use of a code mapping table that correlates location codes to time zones to adjust the time stamp of a SMS message, in accordance with various embodiments. FIG. 2 further illustrates the use of the code mapping table 158 by the MSC 118. As described above, in a MSC pooling scenario, the BSS 124 may report to the MSC 118 that the mobile device 138 is in a network cell of the location area 106 as soon as mobile device 138 roams into or powers up in one of the network cells of the location area 106. In turn, the MSC 118 may record in the VLR 142 the LAC 130 (i.e., "03") to indicate that the mobile device 138 is in the location area 106. Further, the VLR 142 may also record the cell identifier of the network cell that the mobile device 138 is in, such as the cell identifier "01" for the network cell 132(1).

Accordingly, when the MSC 118 subsequently receives the SMS message 150 for routing to the mobile device 138, the MSC 118 may consult the VLR 142 and determine that the mobile device 138 is currently in the location area 106, which has a LAC 130 (e.g., "03"). For example, the MSC 118 may parse the register entry storing the current location of the mobile device 138 to ascertain the LAC 130.

Subsequently, the MSC 118 may consult the code mapping table 158, which may include data entries that correlate the LACs of location areas to time zone designations. For example, a data entry 204 in an instance 202 of the code mapping table 158 may indicate that the location area code 136 (i.e., "03") corresponds to the time zone 112 (as represented by time zone identifier "time zone 3"). Thus, having determined that the LAC 130 is associated with time zone 112, the MSC 118 may modify the time stamp 152 into the modified time stamp 160 with a time that is adjusted to conform to the time zone 112.

In some embodiments, the adjustment of the time stamp 152 into the modified time stamp 160 may further involve taking into account any difference in the observance of daylight savings time. For example, as indicated by the data entry 206 of the code mapping table 158, the location area 102 (as represented by the LAC "01"), observes daylight savings time. However, the data entry 204 indicates that location area 106 (as represented by the LAC "03") does not observe daylight savings time. Thus, in such embodiments, the modification of the time stamp 152 into the modified time stamp 160 may further include adding or subtracting an hour, if applicable, due to different daylight savings time observance practices in the different location areas.

In additional embodiments, the ability of a MSC to properly adjust a time for a mobile device that is located in a different time zone may be leverage to supply network identity and time zone (NITZ) data to a mobile device. NITZ data may includes local time and date as well as network provider information, and is generally transmitted by a MSC to a mobile device following an initial power up and registration of the mobile device with the mobile telecommunication network. However, with MSC pooling, a MSC that is located in a different time zone from the time zone that a mobile device is currently roaming in may supply NITZ data, which may result the mobile device being provided with a time that correlates with an incorrect time zone. Nevertheless, by using the same techniques described above, a MSC may determine the time zone that the mobile device is roaming in, and tailor the NITZ to supply time data that correlates with that time zone. In various embodiments, the time data may include one or more of year, month, day, hour, minutes, second, and time zone designation.

For example, when the mobile device 138 is initially powered on after a period of inactivity, the BSS 124 may report to the MSC 118 that the mobile device 138 is contacting one of the network cells in the location area 106 (e.g., the network cell 132(1)). Accordingly, the MSC 118 may consult the VLR 142 and determine that the mobile device 138 is currently in the location area 106, which has a LAC 130 (e.g., "03"). The MSC 118 may then consult the code mapping table 158 to determine that the location area 106 is in the time zone 112. As such, the MSC 118 may send NITZ data 208 to the mobile device 138 that includes at least time that correlates with the time zone 112.

In further embodiments, the code mapping table 158 may include data entries in which each data entry correlates a combination of a cell identifier and a LAC with a corresponding time zone. Such embodiments of the code mapping table 158 may be used when a LAC spans multiple time zones. For example, as shown in an instance 210 of the code mapping table 158, the code mapping table 158 may include a data entry 212 that maps a network cell with the cell identifier "01", which is in a location area identified by the LAC "04", to a time zone that is identified by the time zone identifier "time zone 4". However, other data entries, such as the data entries 214 and 216, may map additional network cells (as represented by cell identifiers "02" and "03") that are in the same location area to different time zones, such as time zones that are represented by time zone identifiers "time zone 5" and "time zone 6", respectively.

Thus, even in scenarios in which a LAC spans multiple time zones, a MSC using the instance 210 of the code mapping table 158 may nevertheless adjust the time stamp of a SMS message to correlate with the time zone occupied by a recipient mobile device, such as the mobile device 138. Further in such scenarios, the MSC may likewise use the instance 210 of the code mapping table 158 to supply NITZ data that correlates to the time zone occupied by a mobile device at power up.

Example Server Component

Figure 3:
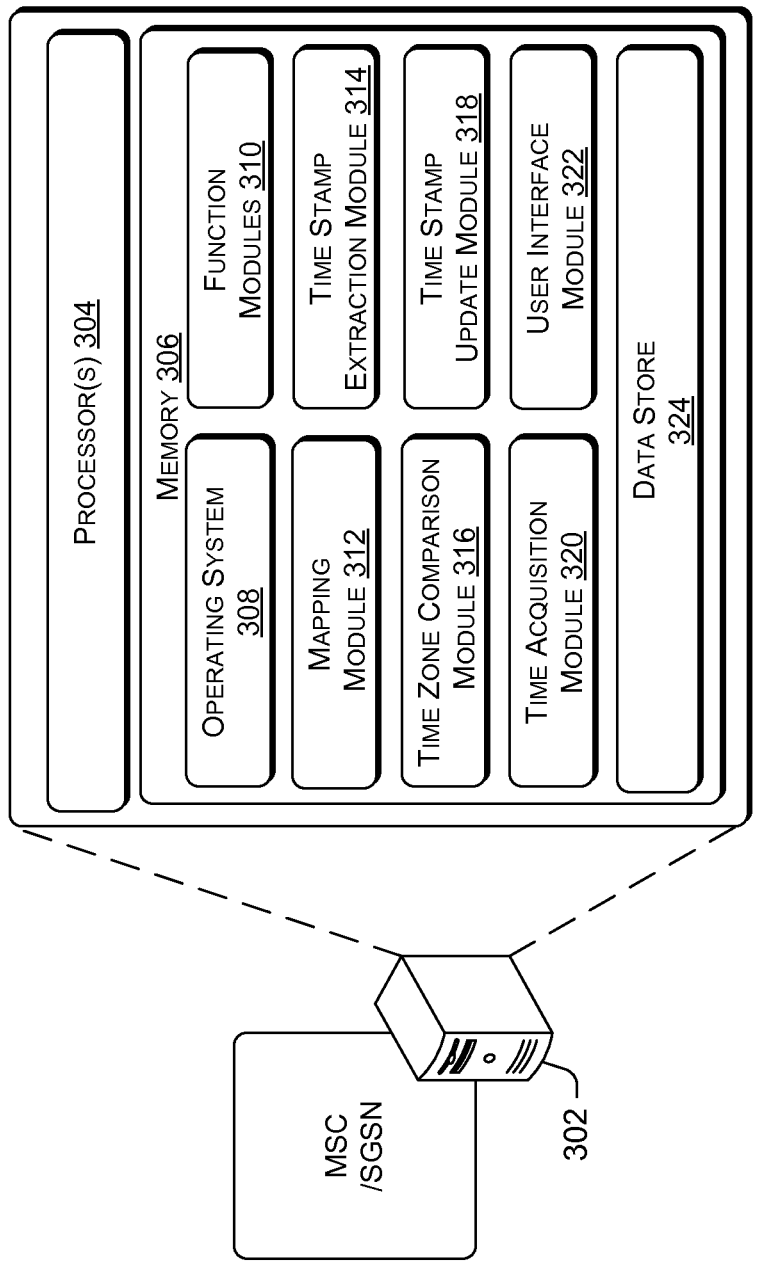
FIG. 3 is a block diagram that illustrates selected components of a server that implements the updating of message time stamps and time information for transmittal to a mobile device.

FIG. 3 is a block diagram that illustrates selected components of a server 302 that implements the updating of message time stamps and time information for transmittal to a mobile device. The server 302 may be a MSC server that is implemented in one of the MSCs described in FIG. 1, such as the MSC 118, or as further described below, a server that is implemented on a Serving GPRS support node (SGSN) or a Mobility Management Entity (MME) of the LTE (Long Term Evolution) network, and so forth.

The server 302 may include one or more processors 304, memory 306, and/or user controls that enable a user to interact with the electronic device. The memory 306 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

The server 302 may have network capabilities. For example, the server 302 may exchange data with other electronic devices (e.g., laptops, computers, other servers, etc.)

via one or more networks, such as the Internet. Communications between the server 302 and the other electronic devices may utilize any sort of communication protocol for sending and receiving messages, such as TCP/IP and/or HTTP. In some embodiments, the server 302 may be substituted with a plurality of networked servers, such as servers in a cloud computing network.

The one or more processors 304 and the memory 306 of the server 302 may implement an operating system 308. The operating system 308 may include components that enable the server 302 to receive and transmit data via various inputs (e.g., user controls, network interfaces, and/or memory devices), as well as process data using the one or more processors 304 to generate output. The operating system 308 may include a presentation component that presents the output (e.g., display the data on an electronic display, store the data in memory, transmit the data to another electronic device, etc.). Additionally, the operating system 308 may include other components that perform various additional functions generally associated with an operating system.

The one or more processors 304 and the memory 306 of the server 302 may also implement one or more function modules 310, a mapping module 312, a time stamp extraction module 314, a time zone comparison module 316, a time stamp update module 318, a time acquisition module 320, a user interface module 322, and a data store 324. The modules may include routines, programs, objects, components, and data structures that cause the server 302 to perform particular tasks.

The function modules 310 may perform operations that are generally associated with a MSC. In various embodiments, the function modules 310 may include components that implement call switching and mobility management functions for mobile device that are roaming on a mobile telecommunication network.

The mapping module 312 may create or update a code mapping table, such as the code mapping table 158, that correlate LACs of location areas and/or cell identifiers of network cells in the location areas with corresponding time zones. In some embodiments, the mapping module 312 may create or update the code mapping table based on manual inputs of LAC and/or cell identifier and time zone correlation data. In other embodiments, the mapping module 312 may also dynamically create or update the code mapping table from data pulled from one or more other databases that are accessible by multiple MSC servers.

The time stamp extraction module 314 may extract time zone information and the time data from time stamps of SMS messages, such as the SMS message 150. For example, the time stamp extraction module 314 may locate the time stamp 152 from a time stamp data element associated with the SMS message 150. The time stamp data element and the SMS message 150 may be stored and transmitted as a single data file. The time stamp extraction module 314 may also strip out the time data 154 and the time zone data 156 from corresponding fields in the time stamp 152.

The time zone comparison module 316 may compare the time zone data extracted from a time stamp of a SMS message to a time zone occupied by a recipient mobile device of the SMS message using the code mapping table 158. For example, the time zone comparison module 316 may obtain the time zone 112 that is occupied by the mobile device 138 by initially parsing the relevant register entry in the VLR 142 and determining that the mobile device 138 is currently in the location area 106, which has a LAC 130 (e.g., "03"). Subsequently, the time zone comparison module 316 may consult an embodiment of the code mapping table 158 and determine that the LAC 130 (i.e., "03") corresponds to the time zone 112. In an alternative example, the time zone comparison module 316 may obtain the time zone occupied by a mobile device by initially consulting the relevant register entry in the VLR 142 and determining that the mobile device is currently in a particular network cell of a location area, as indicated by a corresponding combination of a cell identifier and a LAC. Subsequently, the time zone comparison module 316 may consult an embodiment of the code mapping table 158 to match the combination of the cell identifier and the LAC to a corresponding time zone.

Thus, having determined the time zone that is occupied by a mobile device, the time zone comparison module 316 may compare the time zone of the mobile device to the time zone data of the SMS message. If the time zone data indicates that the time zone of the SMS message is identical to the time zone occupied by the mobile, the time zone comparison module 316 may determine that no modification of the time in the time stamp of the SMS message is to be implemented.

However, as in the example of the SMS message 150, the time zone comparison module 316 may determine that the time zone occupied by the mobile device 138, (i.e., time zone 112) is different from the time zone include in the time zone data 156 (e.g., time zone 108). In such an instance, the time zone comparison module 316 may cause the time stamp update module 318 to update the time stamp 152.

The time stamp update module 318 may update the time stamp of a SMS message when there is a discrepancy between the time zone of the time encapsulated in the time stamp and a time zone occupied by the recipient mobile device of the SMS message. In at least one embodiment, continuing with the example of the SMS message 150 described above, the time stamp update module 318 may overwrite the year, month, day, and hour fields in the time data 154, taking into account any adjustments due to variation in the observance of daylight savings time. For example, if the original time value in the time data 154 is "4:00 p.m.", and the time zone 112 is two hours behind the time zone 110, then the time data 154 may be updated to "2:00 p.m.", while the year, month, day fields may remaining the same after the overwriting. However, in other scenarios, a change in time value may be also accompanied by corresponding change in one or more of the year, month, and day fields as a result of the overwriting. Further, the time stamp update module 318 may also overwrite the time zone 108 designation included in the time zone data 156 with the time zone 112 designation. In various embodiments, the time zone designations may be in the form of custom time zone codes or standard time zone codes, such as Coordinated Universal Time (UTC) time codes.

Once the time stamp update module 318 has performed the time stamp modification for an SMS message, the time stamp update module 318 may command the function modules 310 to continue the transmission of the SMS message with the modified time stamp to the recipient mobile device. For example, the time stamp update module 318 may command the function modules 310 to continue the transmissions of the SMS message 150 with the modified time stamp 160 to the mobile device 138.

The time acquisition module 320 may determine a time in the NITZ data that is passed on to a mobile device at the initial power up and registration of the mobile device with the mobile telecommunication network. In various embodiments, the time acquisition module 320 may determine a time zone that a newly powered up mobile device is located in using a VLR, and then provide NITZ data that includes time information corresponding to the time zone. For example, when the mobile device 138 is initially powered on after a period of inactivity, the BSS 124 may report to the MSC 118 that the mobile device 138 is contacting one of the network cells in the location area 106 (e.g., the network cell 132(1)). Accordingly, the time acquisition module 320 may consult the VLR 142 and determine that the mobile device 138 in currently in the location area 106, which has a LAC 130 (e.g., "03"). The time acquisition module 320 may then consult an embodiment of the code mapping table 158 to determine that the location area 106 is in the time zone 112. As such, the time acquisition module 320 may then insert the appropriate time data, which may include one or more of year, month, day, hour, minutes, second, and time zone designation for the time zone 112 into the NITZ data 208 for delivery to the mobile device 138. In alternative embodiments, the time acquisition module 320 may consult the VLR 142 to determine a cell identifier for the network cell and a LAC for the location area occupied by the mobile device. The time acquisition device 320 may then consult an embodiment of the code mapping table 158 to determine the time zone that corresponds the combination of the cell identifier and the LAC.

The user interface module 322 may enable a user to interact with the various modules on the server 302 using a user interface. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

In various embodiments, the user interface module 322 may enable an operator to update a code mapping table (e.g., code mapping table 158) that is stored in the server 302. In some embodiments, the user interface module 322 may enable a code mapping table to be configured via the mapping module 312. In other embodiments, the user interface module 322 may enable a code mapping table to be configured from an administration application that is used to operate, administrate, and configure the MSC, in which the mapping module 312 is a part of the administration application.

The data store 324 may store a code mapping table (e.g., the coding mapping table 158), a VLR (e.g., VLR 142), and/or other databases that are used for the operations the MSC and to a larger extent, the entire mobile telecommunication network. In some embodiments, the code mapping table may be integrated with a VLR to form a single datable. Additionally, the data store 324 may also store one or more applications that are used to operate, administrate, and configure the MSC and/or the mobile telecommunication network. However, in other embodiments, rather than using a VLR that is stored in the data store 324, the server 302 may interface with an external VLR that is stored on a different part of the mobile telecommunication network of the environment 100.

While the techniques for updating message time stamps and NITZ information for transmittal to mobile devices have been discussed in the context of MSCs in the above FIGS. 1-3, the techniques and operations may also be applied to mobile telecommunication networks that uses Serving GPRS support nodes (SGSNs) in place of the MSCs. For example, in such embodiments, each of the MSCs, such as the MSCs 114, 118, and 122, may be replaced with a corresponding (SGSN). Further, a SGSN server may operate in a similar manner as server 302, except that the function modules 310 may perform operations that are generally associated with a SGSN. Thus, instead of MSC pooling, a similar pooling of SGSNs may occur. Further, in the context of a SGSN, a VLR may store routing area codes (RACs) instead of the LACs. Likewise, the mapping table 158 may correlate each RAC (with or without an accompanying cell identifier) with a corresponding time zone rather than each LAC with a corresponding time zone. However, the RACs may perform identical functions as the LACs, and these and/or other differences between the implementation of SGSNs instead of the MSCs in the mobile telecommunication network do not impact the operations of the techniques described above.

In additional instances, each location area may be identified by both a corresponding LAC and a corresponding RAC. Accordingly, the code mapping table 158 may correlate both the RAC and LAC of each location area (with or without an accompanying cell identifier) to a corresponding time zone. In this way, a single code mapping table 158 may be compatible for use by both MSCs and SGSNs that are implemented in different mobile telecommunication networks.

The mobile telecommunication network that is described in the illustrative environment 100 may include a Global System for Mobile Communications (GSM) network, a General Pack Radio Service (GPRS) network, a Universal Mobile Telecommunication Systems (UMTS) network, a High Speed Packet Access Network (HSPA) network, a HSPA+ network, a Mobility Management Entity (MME)-based 4G Long Term Evolution (LTE) network, and/or other types of mobile telecommunication networks. Nevertheless, in a UMTS network, VLRs may store Service Area Codes (SACs) instead of cell identifiers, in which each SAC may refer to one or more network cells. Further in the UMTS network, UMTS Terrestrial Access Network (UTRAN) may play the roles of BSSs described above, such as the BSSs 116, 120, and 124. Accordingly, the operations of the techniques described above that involve the use of cell identifiers may be instead carried out with the SACs in the UMTS network. Further operations of the above techniques and the various modules of the server 302 are additionally described below with respect to example processes shown in FIGS. 4-7.

Example Operations

FIGS. 4-7 show illustrative processes 400-700 for adjusting time information that is sent to a mobile device based on the time zone occupied by the mobile device. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the environment 100 of FIG. 1.

Figure 4:
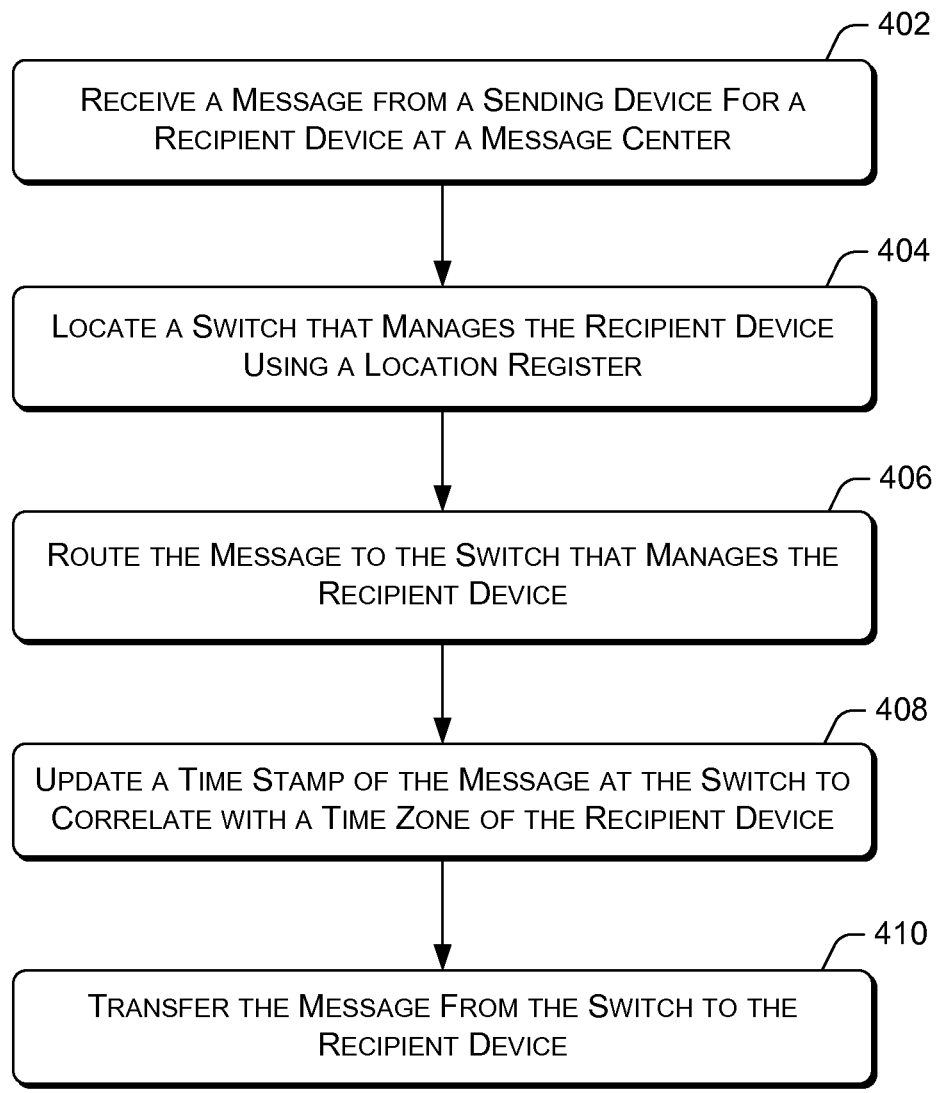
FIG. 4 is a flow chart showing an example process for transmitting a message with a time stamp that correlates with the time zone occupied by a recipient mobile device to the recipient mobile device, in accordance with various embodiments.

FIG. 4 is a flow chart showing an example process 400 for transmitting a message with a time stamp that correlates with the time zone occupied by a recipient mobile device to the recipient mobile device, in accordance with various embodiments.

At block 402, a message center, such as the SMSC 148, may receive a message sent from a sending mobile device and destined for a recipient mobile device. For example, the subscriber of the mobile device 146 may have composed a SMS message 150 for transmittal to the mobile device 138. The SMS message 150 may have been received at the SMSC 148.

At block 404, the message center may locate a switch that is currently managing the recipient mobile device using a location register, such as an HLR. The switch may be a MSC or a SGSN of a mobile telecommunication network. For example, the SMSC 148 may determine from the HLR 134 that the MSC 118 is currently managing the mobile device 138. The MSC 118 may be managing the mobile device 138 even though the mobile device 138 is located in a different time zone due to MSC pooling. At block 406, the message center may route the message to the switch that manages the recipient mobile device. For example, the SMSC 148 may route the SMS message 150 to the MSC 118.

At block 408, the switch may determine the time zone that the recipient mobile device is currently located in by consulting a VLR and a code mapping table. Subsequently, the switch may update the time in a time stamp of the message to correlate with the time zone occupied by the recipient mobile device. For example, the MSC 118 may determine that the mobile device 138 is in the time zone 112 from the VLR 142 and the code mapping table 158. Subsequently, the switch may update the time stamp of 152 of the SMS message 150, which has a time value that correlates with the time zone 108, into the modified time stamp 160 that correlates with the time zone 112.

At block 410, the switch that is managing the recipient mobile device may transfer the message with the modified time stamp to the recipient mobile device. For example, the MSC 118 may transfer the SMS message 150 with the modified time stamp 160 to the mobile device 138 via the BSS 124. In some embodiments, the switch may also generate a report that is transmitted back to the SMSC informing the SMSC that the message was successfully delivered.

Figure 5:
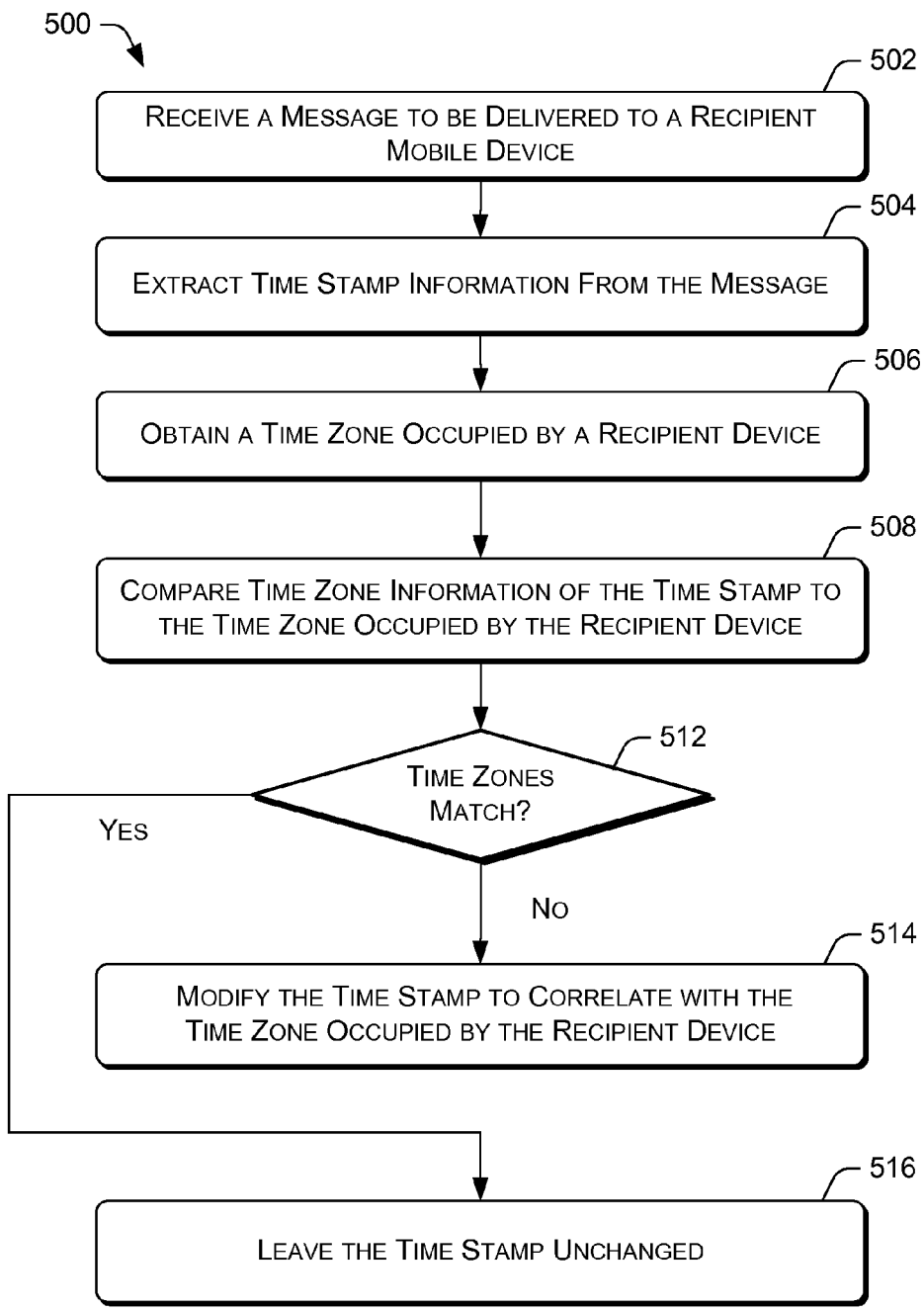
FIG. 5 is a flow chart showing an example process for modifying a time stamp of a message from a sending mobile device to correlate with the time zone occupied by a recipient mobile device, in accordance with various embodiments.

FIG. 5 is a flow chart showing an example process 500 for modifying a time stamp of a message from a sending mobile device to correlate with the time zone occupied by a recipient mobile device, in accordance with various embodiments. The example process 500 may further illustrate block 408 of the example process 400.

At block 502, a switch, such as a MSC or a SGSN, may receive a message that is to be delivered to a recipient mobile device. For example, the MSC 118 may receive the SMS message 150 that is to be delivered to the mobile device 138 via the function modules 310.

At block 504, the time stamp extraction module 314 of the switch may extract time stamp information from a time stamp of the message. For example, the time stamp extraction module 314 may locate the time stamp 152 from a time stamp data element associated with the SMS message 150. The time stamp extraction module 314 may also strip out the time data 154 and the time zone data 156 from corresponding fields in the time stamp 152.

At block 506, the time zone comparison module 316 may obtain a time zone occupied by a recipient mobile device by consulting a VLR and a code mapping table on the switch. For example, the time zone comparison module 316 may obtain the time zone 112 that is occupied by the mobile device 138 by consulting the VLR 142 and the code mapping table 158.

At block 508, the time zone comparison module 316 of the switch may compare the time zone information in the time stamp of the message to the time zone occupied by the recipient mobile device. For example, the time zone comparison module 316 may compare the time zone 112 occupied by the mobile device 138 to the time zone 110 that is recorded in the time zone data 156 of the SMS message 150. However, since the message may have been composed and sent from any number of time zones, the time zone information may indicate various different time zones, such as time zone 110, or some other time zone.

At decision block 510, the time zone comparison module 316 may determine whether the two time zones that are being compared match. If the two time zones do not match ("no" at decision block 512), the process 500 may proceed to block 514.

At block 514, the time stamp update module 318 of the switch may modify the time stamp of the message to correlate with the time zone occupied by the recipient mobile device. For example, time stamp update module 318 may overwrite the year, month, day, and hour fields in the time data 154, taking into account any adjustments due to variation in the observance of daylight savings time. Further, the time stamp update module 318 may also overwrite the time zone 108 designation included in the time zone data 156 with the time zone 112 designation.

However, if the time zone comparison module 316 determines at decision block 512 that the two time zones match ("yes" at decision block 512), then the process 500 may proceed to block 516. At block 516, the time zone comparison module 316 may leave the time stamp of the message unchanged.

Figure 6:
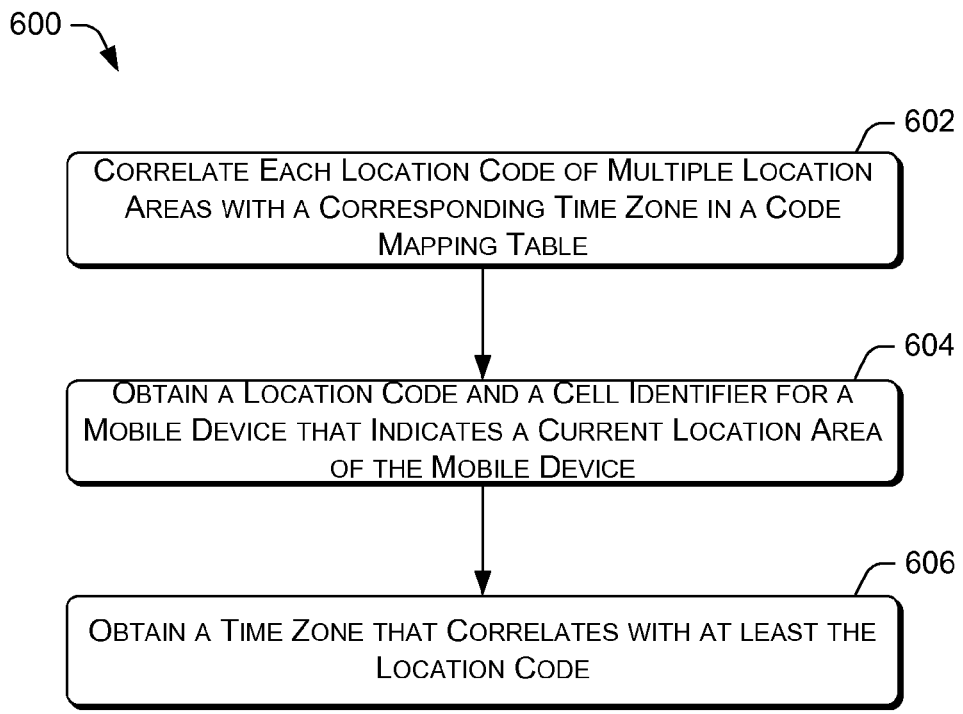
FIG. 6 is a flow chart showing an example process for ascertaining a time zone for a mobile device that correlates with a region that the mobile device is occupying, in accordance with various embodiments.

FIG. 6 is a flow chart showing an example process 600 of ascertaining a time zone for a mobile device that correlates with a region that the mobile device is occupying, in accordance with various embodiments. The example process 600 may further illustrate block 506 of the example process 500.

At block 602, the mapping module 312 of a switch may correlate each location code of multiple location areas with a corresponding time zone in a code mapping table, such as the code mapping table 158. The switch may be a MSC or a SGSN of a mobile telecommunication network, and each location code may be a LAC or a RAC. In at least one embodiment, the code mapping table may also designate whether day light savings time is observed.

At block 604, the switch may obtain a location code and a cell identifier for a mobile device that indicates a current location area and network cell that the mobile device is occupying. For example, the BSS 124 may report to the MSC 118 that the mobile device 138 is in a network cell of the location area 106. The BSS 124 may make such a report as soon as the mobile device 138 roams into or powers up in the location area 106 and establishes communication with a network cell in the location area 106. Subsequently, the switch may store the location code and the cell identifier of the mobile device in a local subscriber register. For example, a switch in the form of the MSC 118 may record in the VLR 142 that the mobile device 138 is currently affiliated with one of the network cells (e.g., network cell 132(1) with the cell identifier "01") of the location area 106, and the location area 106 is identified by the LAC 130.

At block 606, the time zone comparison module 316 of the switch may use a code mapping table to obtain a time zone that correlates with the location code. For example, the time zone comparison module 316 may locate a data entry in an embodiment of the code mapping table 158 that indicates the LAC 130 (i.e., "03") corresponds to the time zone 112. Alternatively, the time zone comparison module 316 may locate a data entry in an embodiment of the code mapping table 158 that indicates that a combination of a location code and a cell identifier corresponds to a particular time zone. Further, while certain aspects of the example process 600 has been described above as involving the use of cell identifiers, these aspects may instead be implemented using SACs in some embodiments.

Figure 7:
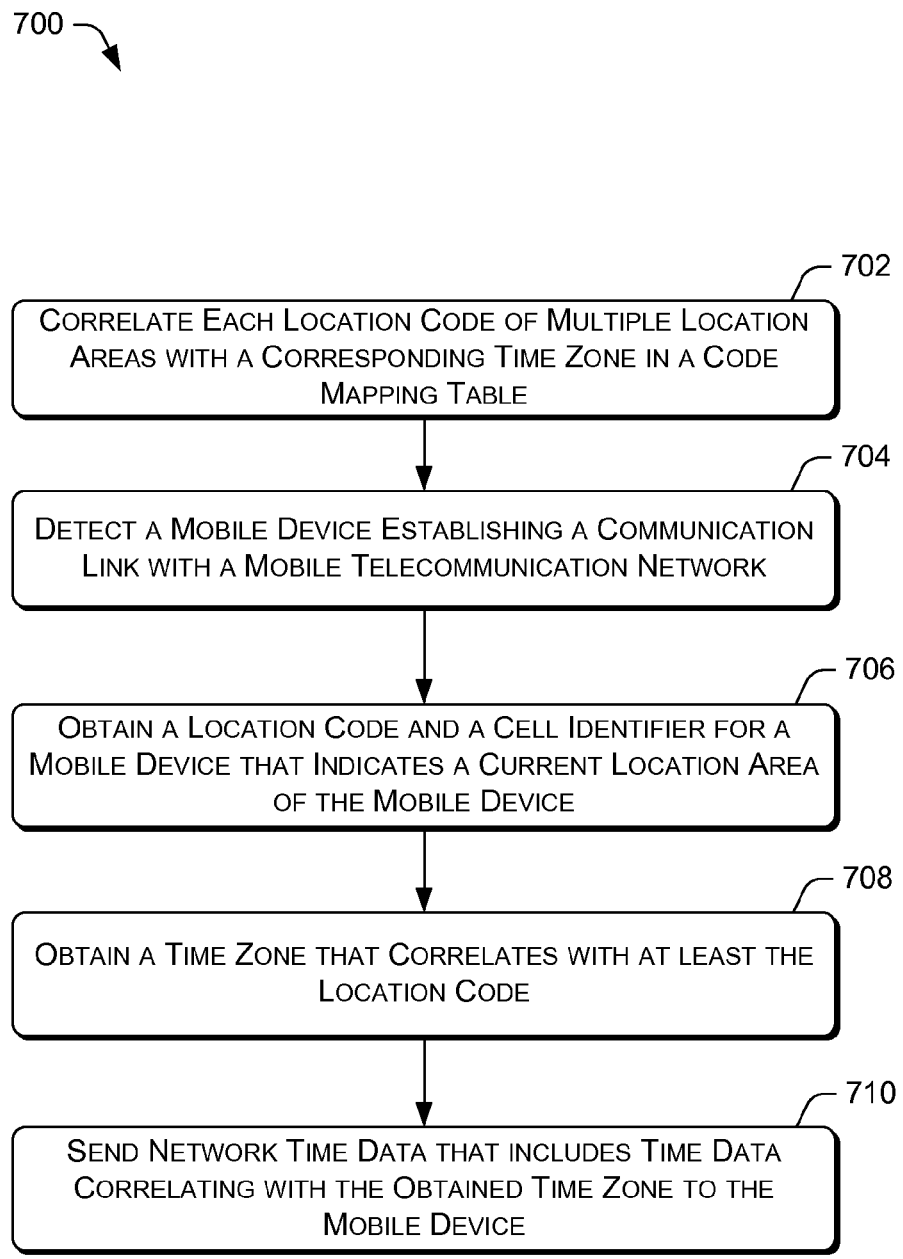
FIG. 7 is a flow chart showing an example process for sending data that includes a time corresponding to a time zone occupied by a mobile device to the mobile device at device start up, in accordance with various embodiments.

FIG. 7 is a flow chart showing an example process for sending data that includes a time corresponding to a time zone occupied by a mobile device to the mobile device at device start up, in accordance with various embodiments.

At block 702, the mapping module 312 of a switch may correlate each location code of multiple location areas with a corresponding time zone in a code mapping table, such as the code mapping table 158. The switch may be a MSC or a SGSN of a mobile telecommunication network, and each location code may be a LAC or a RAC. In at least one embodiment, the code mapping table may also designate whether day light savings time is observed.

At block 704, the switch may detect a mobile device (e.g., mobile device 138) establishing a communication link with the mobile telecommunication network during a power up. At block 706, switch may obtain a location code and a cell identifier for a mobile device that indicates a current location area of the mobile device. For example, the BSS 124 may report to the MSC 118 that the mobile device 138 is in the location area 106 when the mobile device powers up in the location area 106 and establishes communication with the network cell 132(1) of the location area 106. The location area 106 may be identified by the LAC 130, and the network cell 132(1) may be identified by the cell identifier "01".

At block 708, the time acquisition module 320 of the switch may use a code mapping table to obtain a time zone that correlates with the location code. For example, the time zone comparison module 316 may locate a data entry in the code mapping table 158 that indicates the LAC 130 (i.e., "03") corresponds to the time zone 112. Alternatively, the time zone comparison module 316 may locate a data entry in an embodiment of the code mapping table 158 that indicates that a combination of a location code and a cell identifier corresponds to a particular time zone.

At block 710, the NITZ acquisition module 420 may insert time data that correlates with the obtained time zone into network time data (e.g., NITZ data). The time data may include one or more of year, month, day, hour, minutes, second, and time zone designation that correlate with the obtained time zone. The NITZ acquisition module 420 may then command the MSC modules (e.g., function modules 310) in a MSC or comparable SGSN modules in a SGSN to send the network time data to the mobile device. While certain aspects of the example process 700 has been described above as involving the use of cell identifiers, these aspects may instead be implemented using SACs in some embodiments.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A computer-implemented method, comprising:
receiving, by one of a mobile switching center (MSC) or a serving General Packet Radio Service (GPRS) support node (SGSN), a sending mobile device message from a message center, the one of the MSC or SGSN managing a recipient mobile device of the message, the one of the MSC or SGSN being in a first time zone that is different from a second time zone occupied by a recipient mobile device;
extracting, by the one of the MSC or SGSN, a time value and a time zone designation from a time stamp of the message;
comparing, by the one of the MSC or SGSN, a time zone indicated by the time zone designation to the second time zone occupied by the recipient mobile device;
updating, by the one of the MSC or SGSN, the time stamp of the message to correlate with the second time zone occupied by the recipient mobile device, the updating including adjusting the time value based on a time difference between the time zone and the second time zone and modifying the time zone designation to an additional time zone designation for the second time zone; and
transferring, by the one of the MSC or SGSN, the message with the time stamp to the recipient mobile device.

2. The computer-implemented method of claim 1, wherein the message center locates the one of the MSC or SGSN using a location register.

3. The computer-implemented method of claim 1, further comprising determining that the recipient mobile device is in the second time zone by:
obtaining a location code for the recipient mobile device that indicates a current location area of the recipient mobile device from a local subscriber register of the one of the MSC or SGSN; and
correlating the location code to the second time zone using a code mapping table that associates each location code of a plurality of location codes with a corresponding time zone.

4. The computer-implemented method of claim 3, wherein the obtaining the location code from the local subscriber register comprises obtaining one of a Location Area Code (LAC) or a Routing Area Code (RAC) from a Visited Location Register (VLR).

5. The computer-implemented method of claim 1, further comprising:
detecting an additional mobile device that is establishing a communication link with a mobile telecommunication network that includes the one of the MSC or SGSN;
obtaining a location code for the additional mobile device that indicates a current location area of the additional mobile device;
correlating the location code to a particular time zone using a code mapping table that associates each location code of a plurality of location codes with a corresponding time zone; and
sending time data that correlates with the particular time zone to the additional mobile device, the time data including one or more of year, month, day, hour, minute, and second information,
wherein the particular time zone is the first time zone, the second time zone, or a third time zone.

6. The computer-implemented method of claim 1, wherein adjusting the time value includes overwriting one or more of year, month, day, or hour information.

7. The computer-implemented method of claim 1, wherein the adjusting the time value includes adjusting the time value to compensate for a difference in daylight savings observance between the time zone and the second time zone.

8. The computer-implemented method of claim 1, wherein the one of the MSC or SGSN is a part of a Global System for Mobile Communications (GSM) network, a GPRS network, a High Speed Packet Access Network (HSPA) network, a HSPA+ network, a Universal Mobile Telecommunication Systems (UMTS) network, a Mobility Management Entity (MME)-based 4G Long Term Evolution network.

9. The computer-implemented method of claim 1, wherein the receiving the sending mobile device message from the message center comprises receiving a short message service (SMS) message from a short message service center (SMSC).

10. A non-transitory computer-readable medium in one of a mobile switching center (MSC) or a serving General Packet Radio Service (GPRS) support node (SGSN) storing computer-executable instructions that, when executed, cause one or more processors of the one of the MSC or SGSN to perform acts comprising:
  receiving a message having a time stamp that indicates a time value and a time zone designation for the time value, the one of the MSC or SGSN and a recipient mobile device of the message being in different time zones;
  extracting the time value and the time zone designation from the time stamp of the message;
  comparing a time zone indicated by the time zone designation to an additional; time zone occupied by the recipient mobile device;
  when the time zone does not match the additional time zone occupied by the recipient mobile device of the message,
    updating the time stamp, including adjusting the time value in the time stamp based on a time difference between the time zone and the additional time zone and modifying the time zone designation to an additional time zone designation for the additional time zone, and
    transferring the message to the recipient mobile device; and
  when the time zone matches the additional time zone, transferring the message to the recipient mobile device without updating the time stamp.

11. The non-transitory computer-readable medium of claim 10, further comprising instructions that, when executed, cause the one or more processors of the one of the MSC or SGSN to perform acts including:
  obtaining a location code for the recipient mobile device that indicates a current location area of the recipient mobile device from a local subscriber register; and
  correlating the location code to the additional time zone occupied by the recipient mobile device using a code mapping table that associates each location code of a plurality of location codes with a corresponding time zone.

12. The non-transitory computer-readable medium of claim 10, further comprising instructions that, when executed, cause the one or more processors of the one of the MSC or SGSN to perform acts including:
  obtaining a location code and Service Area Code (SAC) combination for the recipient mobile device that indicates a current location area of the recipient mobile device;
  correlating the location code and SAC combination to a time zone using a code mapping table that associates each location code and SAC combination of a plurality of location code and SAC combinations with a corresponding time zone.

13. The non-transitory computer-readable medium of claim 10, wherein an association between a location code and a corresponding time zone is manually assigned or extracted from a database.

14. The non-transitory computer-readable medium of claim 10, wherein the message is from a sending mobile device and is routed to the one of the MSC or SGSN from a message center based on information in a location register.

15. A computer-implemented method, comprising:
  detecting a mobile device establishing a communication link with a switch of a mobile telecommunication network;
  obtaining a location code and cell identifier combination for the mobile device that indicates a current location area of the mobile device;
  correlating the location code and cell identifier combination to a time zone using a code mapping table that associates each location code and cell identifier combination of a plurality of location code and cell identifier combinations with a corresponding time zone; and
  sending time data that correlates with the time zone to the mobile device.

16. The computer-implemented method of claim 15, wherein an association between the location code and cell identifier combination and the time zone in the code mapping table is manually assigned or extracted from a database.

17. The computer-implemented method of claim 15, wherein the sending includes sending the data as network identity and time zone (NITZ) data.

18. One of a mobile switching center (MSC) or a serving General Packet Radio Service (GPRS) support node (SGSN) comprising:
  one or more processors; and
  a memory that includes a plurality of computer-executable components, the plurality of computer-executable components comprising:
    a time stamp extraction component that extracts a time value and a time zone designation from a time stamp of a message for a recipient mobile device that is in a different time zone from the one of the MSC or SGSN;
    a time zone comparison component that compares a time zone indicated by the time zone designation to an additional time zone occupied by the recipient mobile device;
    a time stamp update component that replaces the time stamp with a modified time stamp, the modified time stamp including a replacement time value that is adjusted based on a time difference between the time zone and the additional time zone, and an additional time zone designation for the additional time zone; and
    a function module that delivers the message with the modified time stamp to the recipient mobile device.

19. The one of the MSC or SGSN of claim 18, further comprising a time acquisition component that:
  detects an additional mobile device establishing a communication link with a telecommunication network that includes the one of the MSC or SGSN;
  obtains a location code for the additional mobile device that indicates a current location area of the additional mobile device;
  correlates the location code to a particular time zone using a code mapping table that associates each location code of a plurality of location codes with a corresponding time zone; and
  sends time data that correlates with the particular time zone to the additional mobile device.

20. The one of the MSC or SGSN of claim 18, wherein the time stamp update component further:
  obtains a location code for the recipient mobile device that indicates a current location area of the recipient mobile device from a local subscriber register of the one of the MSC or SGSN; and correlates the location code to the additional time zone using a code mapping table that associates each location code of a plurality of location codes with a corresponding time zone.

21. The one of the MSC or SGSN of claim 20, wherein the local subscriber register is a Visited Location Register (VLR), and the location code is one of a Location Area Code (LAC) or a Routing Area Code (RAC).

* * * * *